(12) United States Patent
Yamada et al.

(10) Patent No.: US 10,975,549 B2
(45) Date of Patent: Apr. 13, 2021

(54) CONSTRUCTION MACHINE

(71) Applicant: Hitachi Construction Machinery Co., Ltd., Tokyo (JP)

(72) Inventors: Yoshihito Yamada, Tsukuba (JP); Wataru Kondo, Abiko (JP); Tetsuya Matsumoto, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 16/600,844

(22) Filed: Oct. 14, 2019

(65) Prior Publication Data

US 2020/0040551 A1    Feb. 6, 2020

Related U.S. Application Data

(63) Continuation of application No. 15/553,283, filed as application No. PCT/JP2016/057133 on Mar. 8, 2016, now abandoned.

(30) Foreign Application Priority Data

Jun. 3, 2015    (JP) .................................. 2015-113147

(51) Int. Cl.
*E02F 9/08* (2006.01)
*F01N 3/08* (2006.01)
(Continued)

(52) U.S. Cl.
CPC ............ *E02F 9/0883* (2013.01); *B60K 13/04* (2013.01); *B60K 15/03* (2013.01); *E02F 3/30* (2013.01);
(Continued)

(58) Field of Classification Search
CPC ...... F01N 3/08; F01N 3/2066; F01N 2340/02; F01N 2590/08; F01N 2610/02;
(Continued)

(56) References Cited

U.S. PATENT DOCUMENTS

2010/0252494 A1    10/2010   Kitajima et al.
2012/0174566 A1    7/2012    Yamashita et al.
(Continued)

FOREIGN PATENT DOCUMENTS

EP    2 578 832 A1    4/2013
JP    2006-283724 A   10/2006
(Continued)

OTHER PUBLICATIONS

International Search Report (PCT/ISA/210) issued in PCT Application No. PCT/JP2016/057133 dated Jun. 7, 2016 with English translation (Four (4) pages).
(Continued)

*Primary Examiner* — Audrey K Bradley
(74) *Attorney, Agent, or Firm* — Crowell & Moring LLP

(57) ABSTRACT

A hollow first accommodating case (28) is provided on a front part of a revolving frame (5) at a position on a front side of a fuel tank (23), and a fuel supply pump (34) for supplying a fuel stored in an external fuel storage source to the fuel tank (23) is provided on the fuel tank (23) by being connected. A fuel suction port (35) for sucking the fuel toward the fuel supply pump (34) is provided in the first accommodating case (28) by being opened to an outside, and a urea water tank (25) is provided by being accommodated in the first accommodating case (28). A water supply port (25G) of a urea water is provided in the urea water tank (25) by being opened to the outside, and the fuel suction port (35) and the water supply port (25G) of the urea water are juxtaposed and arranged in the first accommodating case (28).

2 Claims, 10 Drawing Sheets

(51) Int. Cl.
| | |
|---|---|
| *B60K 15/03* | (2006.01) |
| *B60K 13/04* | (2006.01) |
| *E02F 3/30* | (2006.01) |
| *F02M 37/40* | (2019.01) |
| *F01N 3/20* | (2006.01) |
| *F02D 41/22* | (2006.01) |
| *F02M 37/00* | (2006.01) |
| *F02M 37/04* | (2006.01) |
| *F15B 11/08* | (2006.01) |
| *E02F 3/32* | (2006.01) |

(52) U.S. Cl.
CPC ............ *E02F 9/0866* (2013.01); *F01N 3/08* (2013.01); *F01N 3/2066* (2013.01); *F02D 41/22* (2013.01); *F02M 37/0076* (2013.01); *F02M 37/04* (2013.01); *F02M 37/40* (2019.01); *F15B 11/08* (2013.01); *B60Y 2200/412* (2013.01); *E02F 3/32* (2013.01); *E02F 9/0891* (2013.01); *F01N 2340/02* (2013.01); *F01N 2590/08* (2013.01); *F01N 2610/02* (2013.01); *F01N 2610/1406* (2013.01); *F02D 2041/224* (2013.01)

(58) Field of Classification Search
CPC ........ F01N 2610/1406; F02M 37/0076; F02M 37/04; F02M 37/22; F15B 11/08; B60K 13/04; B60K 13/1503; E02F 3/30; E02F 3/32; E02F 9/0866; E02F 9/0883; E02F 9/0891; F02D 41/22; F02D 2041/224; B60Y 2200/412; Y02T 10/24
See application file for complete search history.

(56) References Cited

U.S. PATENT DOCUMENTS

| | | | |
|---|---|---|---|
| 2013/0071295 | A1 | 3/2013 | Terakawa et al. |
| 2015/0016932 | A1 | 1/2015 | Azuma et al. |

FOREIGN PATENT DOCUMENTS

| | | | | |
|---|---|---|---|---|
| JP | 2008-196234 | A | | 8/2008 |
| JP | 2009-162686 | A | | 7/2009 |
| JP | 2009162686 | A | * | 7/2009 |
| JP | 2010-70007 | A | | 4/2010 |
| JP | 2010-101306 | A | | 5/2010 |
| JP | 2010-203160 | A | | 9/2010 |
| JP | 2010-261373 | A | | 11/2010 |
| JP | 2011-12661 | A | | 1/2011 |
| JP | 2011-64132 | A | | 3/2011 |
| JP | 2011-247232 | A | | 12/2011 |
| JP | 2014-163190 | A | | 9/2014 |

OTHER PUBLICATIONS

Japanese-language Written Opinion (PCT/ISA/237) issued in PCT Application No. PCT/JP2016/057133 dated Jun. 7, 2016 (Four (4) pages).
Extended European Search Report issued in counterpart European Application No. 16802869.4 dated Dec. 13, 2018 (eight (8) pages).
Japanese-language Office Action issued in counterpart Japanese Application No. 2015-113147 dated Jun. 4, 2019 (five (5) pages).

* cited by examiner

CONSTRUCTION MACHINE

CROSS REFERENCE TO RELATED APPLICATIONS

This application is a continuation of U.S. application Ser. No. 15/553,283, filed Aug. 24, 2017, which is a National Stage of PCT/JP2016/057133, filed Mar. 8, 2016, which claims priority from Japanese Patent Application No. 2015-113147, filed on Jun. 3, 2015, the disclosures of which are expressly incorporated by reference herein.

TECHNICAL FIELD

The present invention relates to a construction machine on which a urea water tank: storing urea water as a liquid reducing agent is mounted, for example.

BACKGROUND ART

In general, a hydraulic excavator as a typical example of a construction machine is constituted by a lower traveling structure, an upper revolving structure rotatably mounted on the lower traveling structure, and a working mechanism tiltably provided on a front part of the upper revolving structure.

The upper revolving structure includes a revolving frame constituting a support structural body, an engine mounted on a rear side of the revolving frame and driving a hydraulic pump, a hydraulic oil tank provided on the revolving frame at a position on a front side of the engine and storing a hydraulic oil to be supplied to the hydraulic pump, a fuel tank provided on the revolving frame, adjacent to the front side of the hydraulic oil tank, and storing a fuel to be supplied to the engine, a NOx purifying device provided by being connected to an exhaust pipe of the engine and removing nitrogen oxides (hereinafter referred to as NOx) contained in an exhaust gas, and a urea water tank storing urea water to be supplied to the NOx purifying device.

Here, in a case where the urea water tank is to be provided on a hydraulic excavator, such constitution is known that the urea water tank is installed by using a tool box provided on the front side of the fuel tank, and a supply work of the urea water is performed from front of the tool box. (see Patent Document 1, for example).

PRIOR ART DOCUMENT

Patent Document

Patent Document 1: Japanese Patent Laid-Open No. 2011-12661 A.

SUMMARY OF THE INVENTION

In the constitution according to Patent Document 1, a fuel filling opening for supplying a fuel is provided on an upper surface position of the fuel tank. Thus, when the fuel is to be supplied to the fuel tank, a worker needs to ride on an upper surface portion of the tool box as a step and to make an access to the fuel filing opening of the fuel tank.

However, according to the constitution of Patent Document 1, during the supply work of the urea water, a cover for opening/closing an opening of the tool box is opened upward. Thus, since the worker cannot use the upper surface portion of the tool box as a step, a water supply work of the urea water and a fuel filling work of the fuel tank cannot be performed at the same time, which leads to a problem that workability of the supply works is lowered.

The present invention was made in view of the aforementioned problem of the prior art, and an object of the present invention is to provide a construction machine which can improve the workability during the supply work by performing supply works to the urea water tank and to the fuel tank at the same time.

A construction machine according to the present invention is constituted by a lower traveling structure, an upper revolving structure rotatably mounted on the lower traveling structure, and a working mechanism tiltably provided on a front part of the upper revolving structure, wherein the upper revolving structure includes; a revolving frame constituting a support structural body, an engine mounted on a rear side of the revolving frame and driving a hydraulic pump, a hydraulic oil tank provided on the revolving frame at a position on a front side of the engine and storing a hydraulic oil to be supplied to the hydraulic pump, a fuel tank provided on the revolving frame, adjacent to the front side of the hydraulic oil tank, and storing a fuel to be supplied to the engine, a NOx purifying device provided by being connected to an exhaust pipe of the engine and removing nitrogen oxides contained in an exhaust gas, and a urea water tank storing urea water to be supplied to the NOx purifying device.

In order to solve the aforementioned problem, a characteristic of the constitution adopted by the present invention is that, a hollow accommodating case is provided on a front part of the revolving frame at a position on a front side of the fuel tank; a fuel supply pump for supplying the fuel stored in an external fuel storage source to the fuel tank is provided by being connected in the fuel tank; a fuel suction port for sucking the fuel toward the fuel supply pump is provided in the accommodating case by being opened to an outside; the urea water tank is provided by being accommodated in the accommodating case; a water supply port of the urea water is provided in the urea water tank by being opened to the outside; and the fuel suction port and the water supply port of the urea water are juxtaposed and arranged in the accommodating case.

According to the construction machine of the present invention, the supply work can be performed to the urea water tank and the fuel tank at the same time, which can improve workability during the supply works.

MODE FOR CARRYING OUT THE INVENTION

Hereinafter, the embodiment of a construction machine according to the present invention will be explained in detail with reference to FIG. 1 to FIG. 10 by taking a case where the construction machine is applied to a crawler-type hydraulic excavator as an example.

Figure 1:
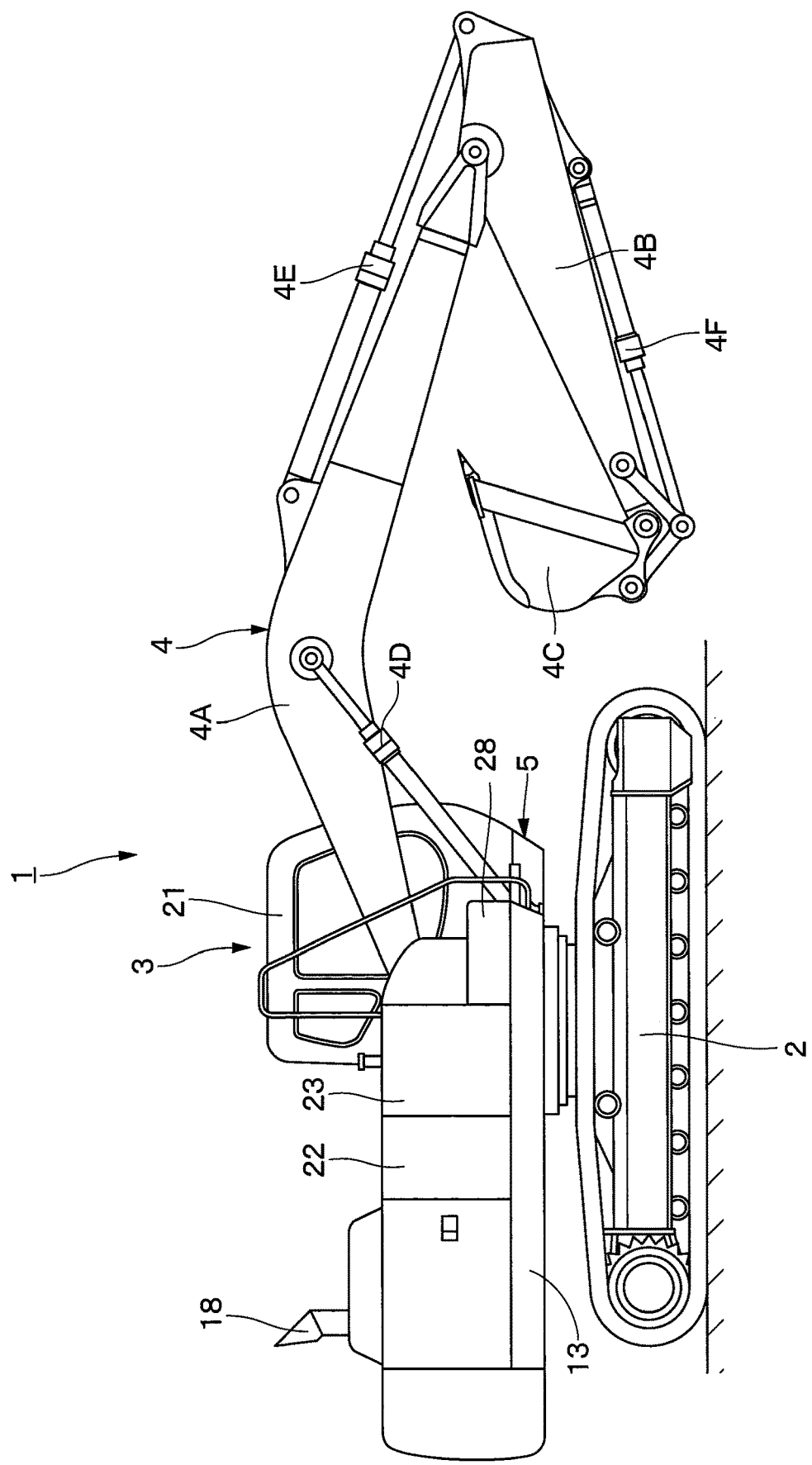
FIG. 1 is a front view showing a hydraulic excavator that is applied to the embodiment of the present invention.

In FIG. 1, the hydraulic excavator 1 as a construction machine used in an excavating work of earth and sand or the like is constituted by an automotive crawler-type lower traveling structure 2, an upper revolving structure 3 rotatably mounted on the lower traveling structure 2, and a working mechanism 4 tiltably provided on a front side of the upper revolving structure 3.

The working mechanism 4 includes a boom 4A, an arm 4B, and a bucket 4C, and they are rotated by a boom cylinder 4D, an arm cylinder 4E, and a bucket cylinder 4F. Here, as shown in FIG. 2, a foot part 4A1 of the boom 4A constituting the working mechanism 4 is rotatably pin-connected to left and right boom mounting portions located on upper parts of left and right vertical plates 7 and 8.

Figure 2:
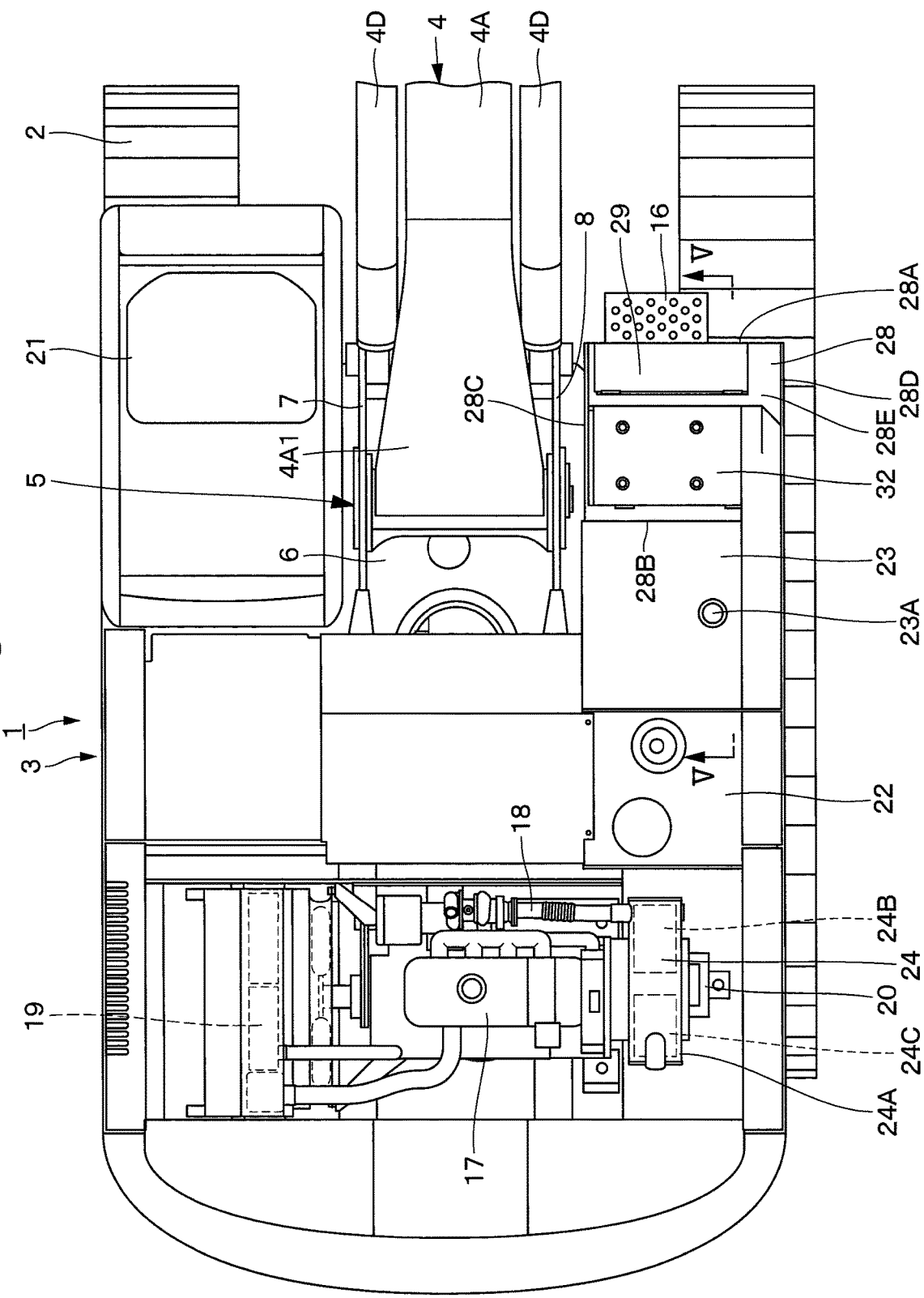
FIG. 2 is a plan view showing the hydraulic excavator in a state where a part of a working mechanism and a housing cover is omitted.

As shown in FIG. 2, the upper revolving structure 3 is constituted by a revolving frame 5, an engine 17, a hydraulic oil tank 22, a fuel tank 23, a NOx purifying device 24, a urea water tank 25, a first accommodating case 28, a fuel supply pump 34, a fuel suction port 35 and the like which will be described later.

Figure 3:
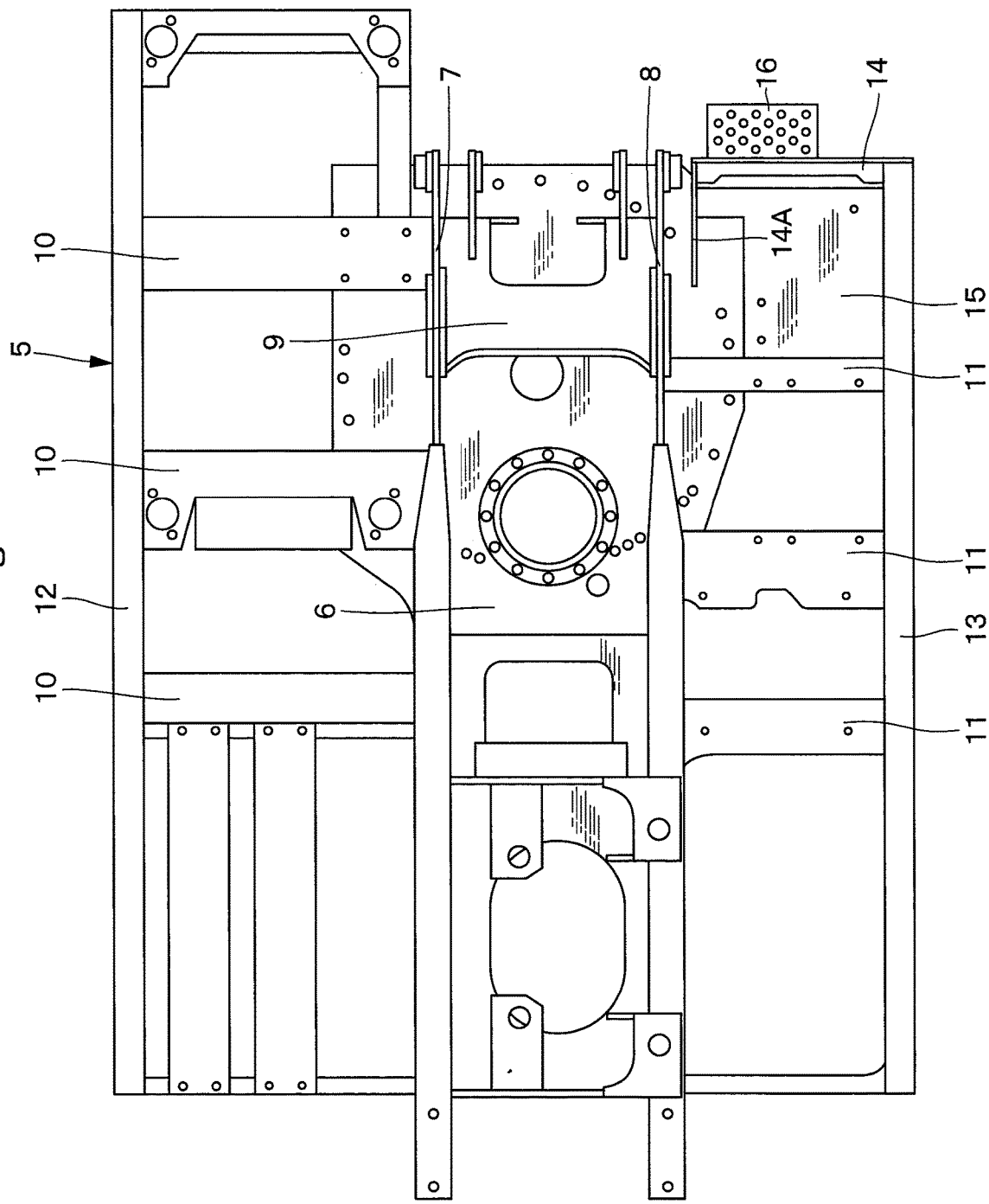
FIG. 3 is a plan view showing a revolving frame as a single body.
Figure 4:
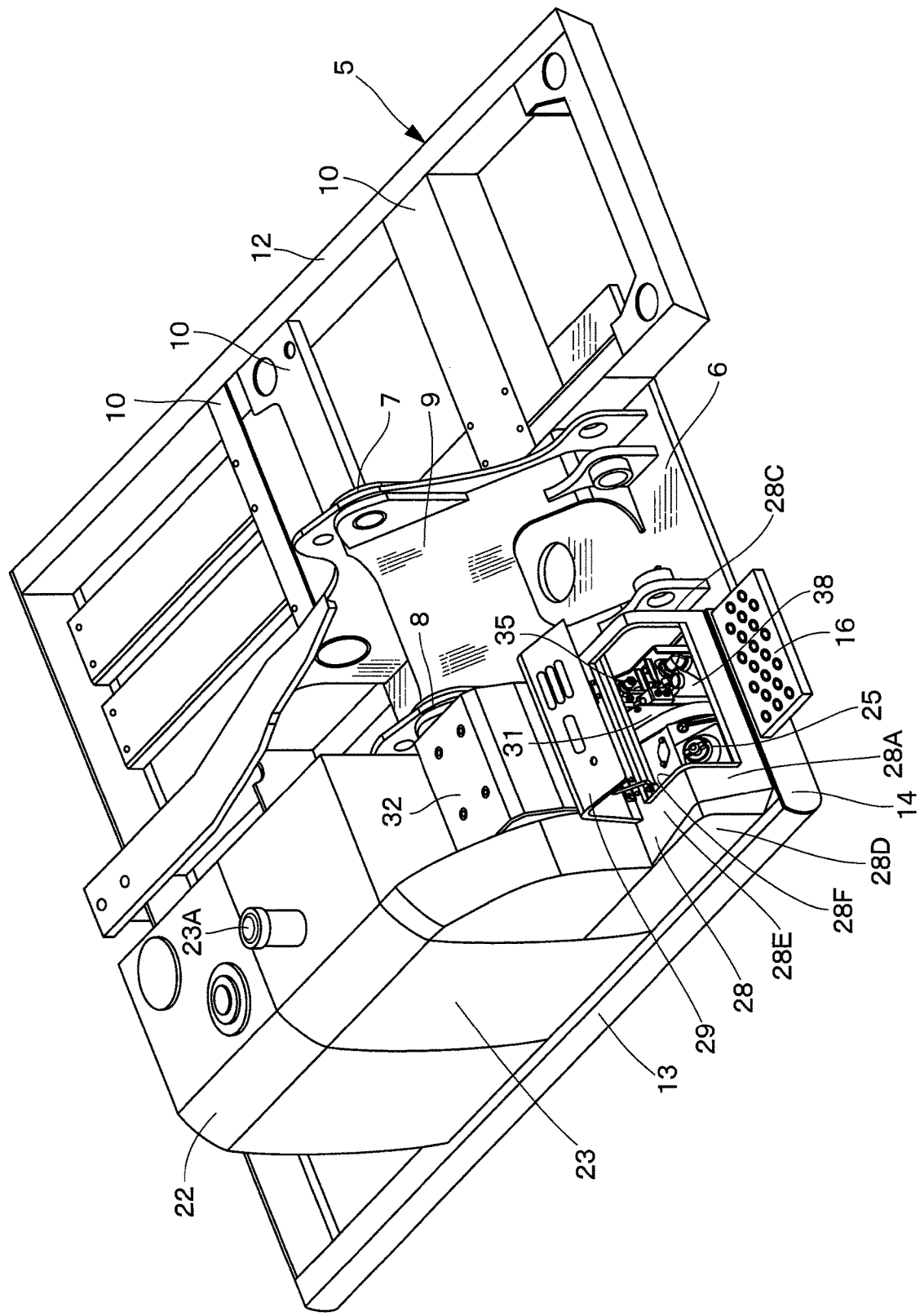
FIG. 4 is a perspective view showing a state where a hydraulic oil tank, a fuel tank, a urea water tank, each of accommodating cases, a fuel suction port and the like are mounted on the revolving frame.

As shown in FIG. 3, the revolving frame 5 is to constitute a support structural body of the upper revolving structure 3. This revolving frame 5 is constituted by including a thick bottom plate 6 extending in a front-rear direction, a left vertical plate 7 and a right vertical plate 8 installed upright on the bottom plate 6 and extending in the front-rear direction with a predetermined interval in a left-right direction, a front plate 9 connecting front side portions of the left and right vertical plates 7 and 8 in the left-right direction, a plurality of left extension beams 10 extending from the bottom plate 6 and the left vertical plate 7 to the left side, a plurality of right extension beams 11 extending from the bottom plate 6 and the right vertical plate 8 to the right side, a left side frame 12 joined to a distal end portion of each of the left extension beams 10 and extending on the left side of the bottom plate 6 in the front-rear direction, and a right, side frame 13 joined to a distal end portion of each of the right extension beams 11 and extending on the right side of the bottom plate 6 in the front-rear direction.

Figure 9:
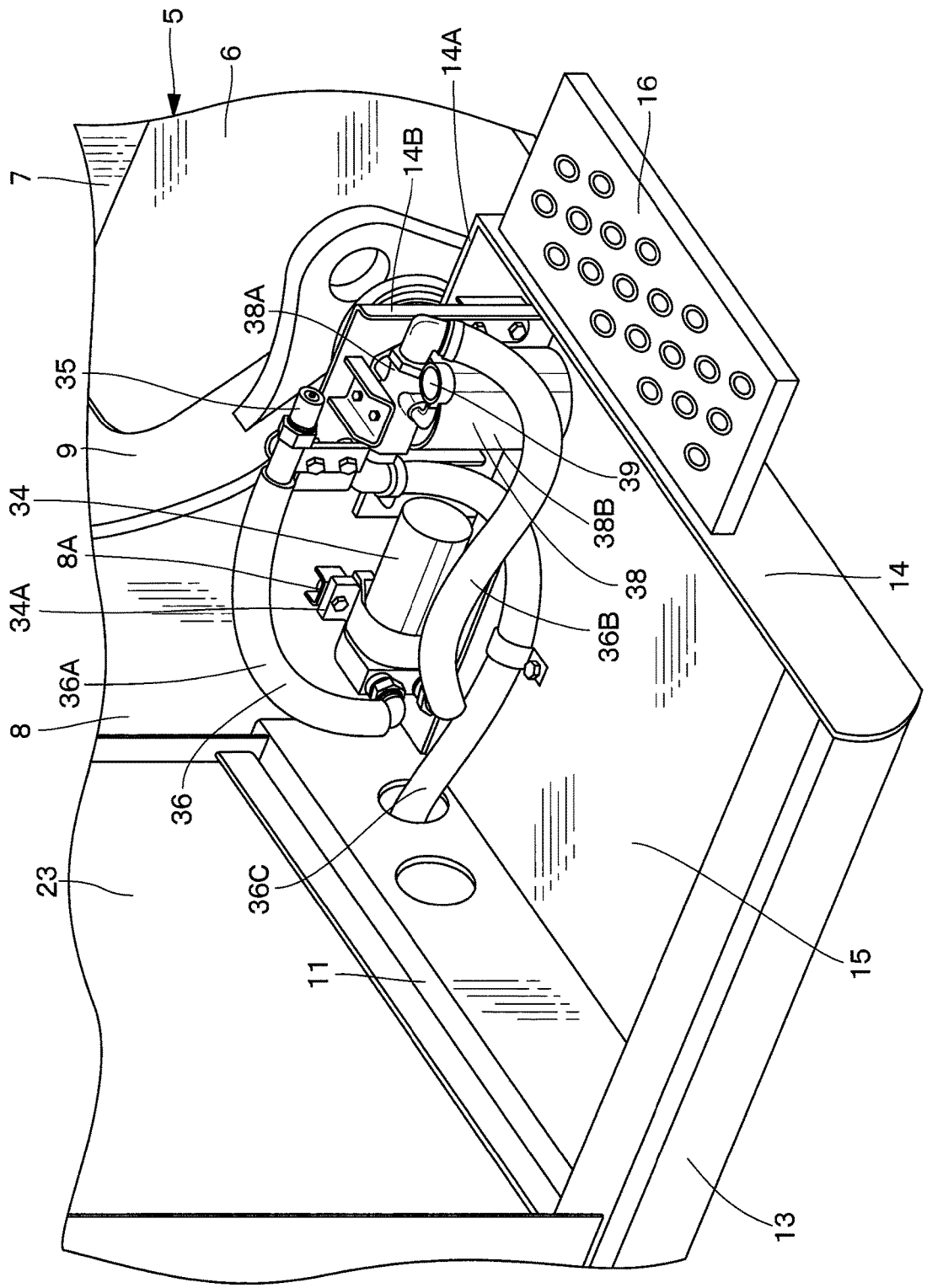
FIG. 9 is a perspective view showing the front side portion of the revolving frame, a fuel supply pump, a fuel suction port and the like while a partition plate, a urea water tank and the like are omitted.

As shown in FIG. 9, a screw seat 8A is provided on a right surface of the right vertical plate 8 at a position in the vicinity of a rear side of a mounting plate 14A of a front side beam 14 which will be described later. The fuel supply pump 34 which will be described later is mounted on this screw seat 8A.

The front side beam 14 is provided on a front, right side of the revolving frame 5 by extending in the left-right direction between a front part of the right vertical plate 8 and a front part of the right side frame 13. The mounting plate 14A is installed upright on a left end of this front side beam 14 so as to extend to a rear side. A mounting bracket 14B extending in a vertical direction is provided on a right surface of this mounting plate 14A. A fuel filter 38 and the like which will be described later are provided on this mounting bracket 14B.

The front side beam 14, the right extension beam 11 faced with the front side beam 14, and a front part of the right side frame 13 constitute the support structural body surrounding to support the first accommodating case 28 which will be described later. An undercover 15 is provided at a position on the bottom part side on an inner side surrounded by the bottom plate 6, the right extension beam 11, the right side frame 13, and the front side beam 14 (see FIG. 3). Moreover, a footstep plate 16 is provided on the front part of the front side beam 14 by protruding to the front side, and the footstep plate 16 constitutes a step on which a foot is first stepped when riding on the upper revolving structure 3.

The engine 17 is mounted on a laterally placed state on a rear side of the revolving frame 5. This engine 17 is constituted as a diesel engine, and an exhaust pipe 18 for exhausting an exhaust gas is provided on its exhaust side.

A heat exchanger 19 is provided on the revolving frame 5 at a position on the left side of the engine 17. This heat exchanger 19 is constituted by a radiator for cooling an engine cooling water, an oil cooler for cooling a hydraulic oil, an intercooler for cooling air suctioned by the engine 17 from a suction side and the like.

A hydraulic pump 2u is provided on the right side or the engine 17. This hydraulic pump 20 delivers the hydraulic oil from the hydraulic oil tank 22 as a pressurized oil by being driven by the engine 17.

A cab 21 is provided on a front left side of the revolving frame 5 or more specifically, on the left side of the foot part 4A1 of the boom 4A constituting the working mechanism 4. This cab 21 is on which an operator gets onboard in order to operate the hydraulic excavator 1 and has an operator's seat on which the operator is seated, levers and pedals for various operations and the like (none of them is shown) disposed therein.

The hydraulic oil tank 22 is provided on the right side of the revolving frame 5 at a position on a front side of the engine 17. This hydraulic oil tank 22 is to store the hydraulic oil to be supplied to the hydraulic pump 20 and is formed as a cuboid-shaped pressure-resistant tank extending in the vertical direction, for example.

The fuel tank 23 is provided on the right side of the revolving frame 5 so as to be adjacent to the front side of the hydraulic oil tank 22. This fuel tank 23 is to store a fuel to be supplied to the engine 17 and is formed as a cuboid-shaped hollow container, for example. A fuel filling opening 23A for filling the fuel is provided on an upper surface of the fuel tank 23 by protruding upward. This fuel filling opening 23A is used when the fuel is to be filled from a fuel filling vehicle. Moreover, a connecting port 23B is provided at a position on the upper side on a rear surface of the fuel tank 23. A supply hose 36C of an oil supply line 36 which will be described later is connected to this connecting port 23B.

The NOx purifying device 24 is connected to the exhaust pipe 18 at a position on the right side of the engine 17 (see FIG. 2). This NOx purifying device 24 is to remove nitrogen oxides (NOx) is the exhaust gas by using a urea water solution (hereinafter referred to as a urea water) which is a reducing agent. The NOx purifying device 24 is constituted by an accommodating tubular body 24A connected to the exhaust pipe 18, a urea selective reduction catalyst 24B accommodated on an upstream side in the accommodating tubular body 24A, an oxidation catalyst 24C arranged on a downstream side of the urea selective reduction catalyst 24B, and a urea water injection valve (not shown) provided on an upstream side of the urea selective reduction catalyst 24B or in the exhaust pipe 18, for example. The urea water injection valve is connected to the urea water tank 25 through a supply pump and a supply pipeline (none of them is shown).

Here, the NOx purifying device 24 injects the urea water into the exhaust gas by the urea water injection valve, causes a reduction reaction of NOx in the exhaust gas by using ammonia generated from the urea water by the urea selective reduction catalyst 24B and decomposes it to water and nitrogen. Then, ammonia in the exhaust gas is decreased by the oxidation catalyst 24C.

The urea water tank 25 is provided by being accommodated in an accommodating space 30 of the first accommodating case 28 which will be described later. This urea water tank 25 is to store the urea water to be supplied to the NOx purifying device 24. The urea water tank 25 is fixed to a tank bracket 26 installed upright on the undercover 15 at a position in the vicinity on the front side of the fuel tank 23 by using a fixing belt 27 in a state placed on the undercover 15 of the revolving frame 5, for example.

Figure 7:
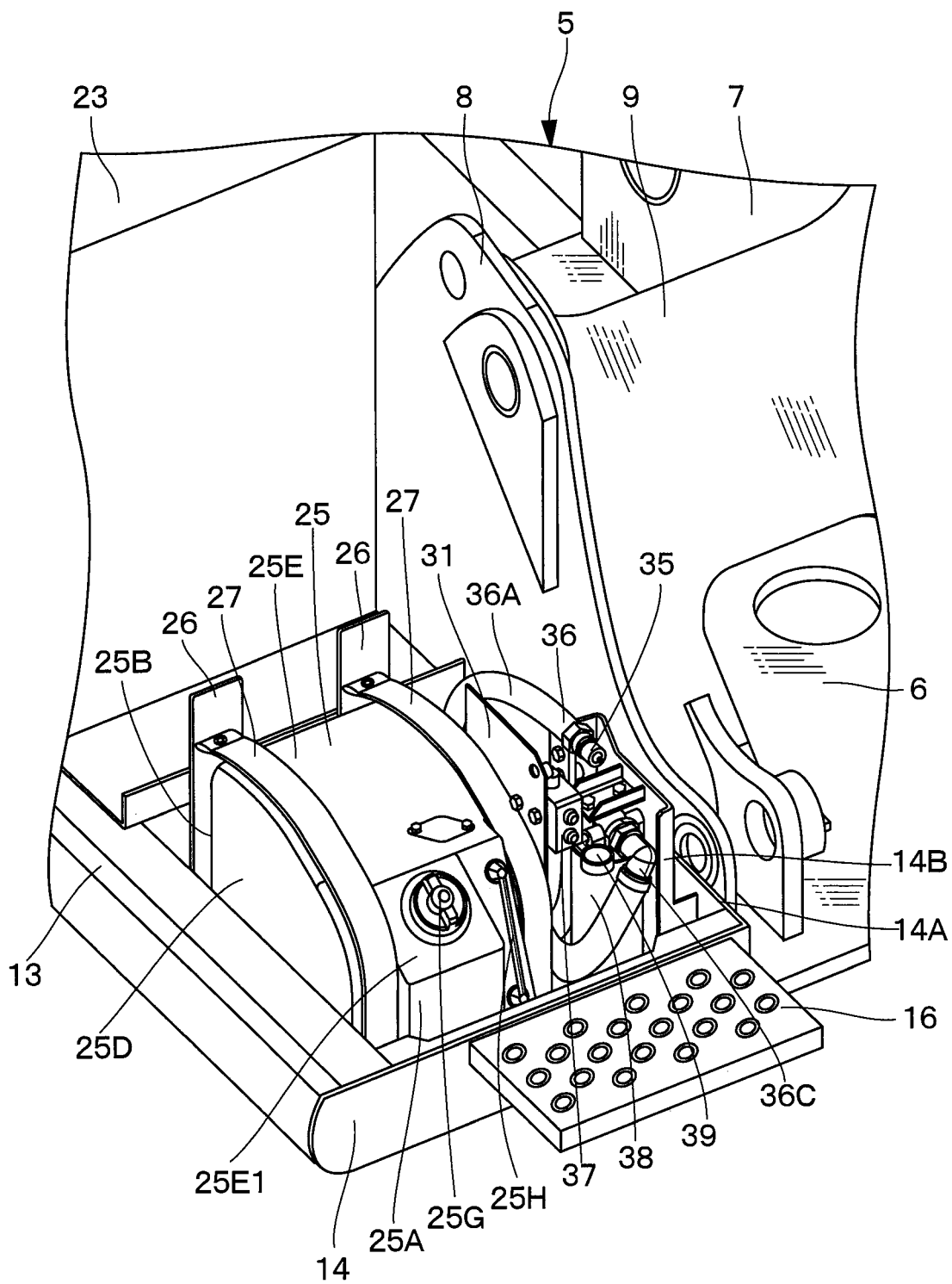
FIG. 7 is a perspective view showing the front side portion of the revolving frame from which each of the accommodating cases is omitted when seen from a position similar to that in FIG. 6.

Specifically, as shown in FIG. 7, the urea water tank 25 is formed as a sealed container having an outside dimension contained within a range of an approximately right half of the accommodating space 30. The urea water tank 25 is constituted by a front surface part 25A, a rear surface part 25B, a left side surface part 25C, a right side surface part 25D, a top surface part 25E, and a bottom surface part 25F.

The top surface part 25E of the urea water tank 25 has its front side portion 25E1 inclined downward. A water supply port 25G for supplying the urea water is provided on this front side portion 25E1 toward a diagonally upper side and opened to the outside. Specifically, the water supply port 25G is arranged at a position where an opening/closing cover 29 of the first accommodating case 28 which will be described later is opened, and a supply work can be performed from the front, in a state where an opening 28F is left open. Moreover, a gauge 25H is provided on the front side portion 25E1 of the top surface part 25E at a position on a left side of the water supply port 25G. This gauge 25H is for inspection of a water amount, a deterioration state and the like of the urea water in the urea water tank 25.

Figure 5:
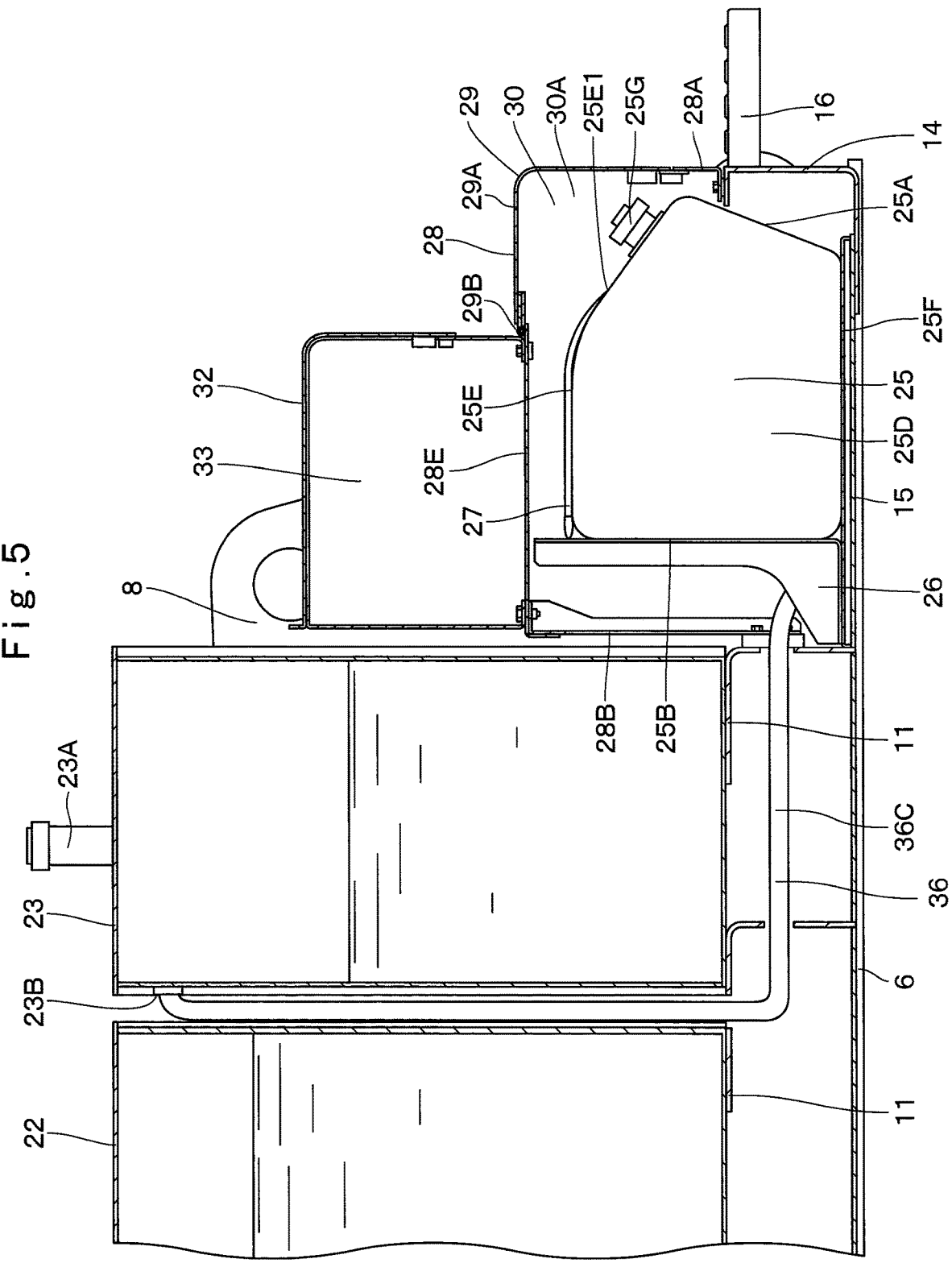
FIG. 5 is a sectional view of the revolving frame, the fuel tank, the urea water tank, each of the accommodating cases and the like showing from an arrow V-V direction in FIG. 2.

The first accommodating case 28 is provided on a front side from the fuel tank 23, that is, at a position on a front right part of the revolving frame 5. As shown in FIG. 5 and FIG. 7, the first accommodating case 28 uses a space on the undercover 15 surrounded by the right extension beam 11 of the revolving frame 5, a front part of the right side frame 13, and a front side beam 14. Thereby, the first accommodating case 28 can define the accommodating space 30 having a large capacity inside thereof.

The first accommodating case 28 is formed as a case having a hollow structure made of a cuboid. Specifically, the first accommodating case 28 is formed having a length dimension in the front-rear direction from a front end of the fuel tank 23 to a front end of the front side beam 14 of the revolving frame 5, a width dimension in the left-right direction equal to a width dimension of the fuel tank 23, and a height dimension in the vertical direction covering the urea water tank 25 and the like, for example. As shown in FIG. 5, the first accommodating case 28 is constituted by a front surface part 28A formed by standing upright from the front end of the front side beam 14 of the revolving frame 5, a rear surface part 28B installed upright at a position close to the front end of the fuel tank 23, a left side surface part 28C and a right side surface part. 28D installed upright so as to stand between the front surface part 28A and the rear surface part 28B, and a top surface part 28E having a substantially regular square shape closing an upper side of each of the surface parts 28A to 28D.

Here, the rear surface part 28B is formed as a square frame-shaped plate body having a center part largely opened. However, since the rear surface part 28B is faced with and close to the front end of the fuel tank 23, the rear surface part 28B is substantially in a closed state. Thereby, as shown in FIG. 5, the first accommodating case 28 has a bottom-out structure and by being bolted to the front side of the revolving frame 5, the accommodating case 28 defines the large accommodating space 30 together with the undercover 15 of the revolving frame 5 on the lower side.

The opening 28F having a large width in the left-right direction over the front surface part 28A and the top surface part 28E is provided with the first accommodating case 28. The water supply port 25G of the urea water tank 25, the fuel suction port 35 and the like are arranged in this opening 28F.

The opening/closing cover 29 constitutes a part of the first accommodating case 28 and is mounted on the first accommodating case 28 so as to cover the opening 28F. A rear part of an upper plate 29A which becomes a second step subsequent to the footstep plate 16 is mounted on the rear part of the top surface part 28E capable of being opened/closed through a hinge 291B working as a fulcrum of the opening/closing cover 29. Thereby, the opening/closing cover 29 can prevent entry of earth and sand or dusts by locking in a state closed and covering the opening 28F or can prevent tampering or the like. On the other hand, by opening the opening/closing cover 29, the opening 28F can be opened, and the water supply port 25G, the fuel suction port 35 and the like can be exposed to the outside.

Figure 6:
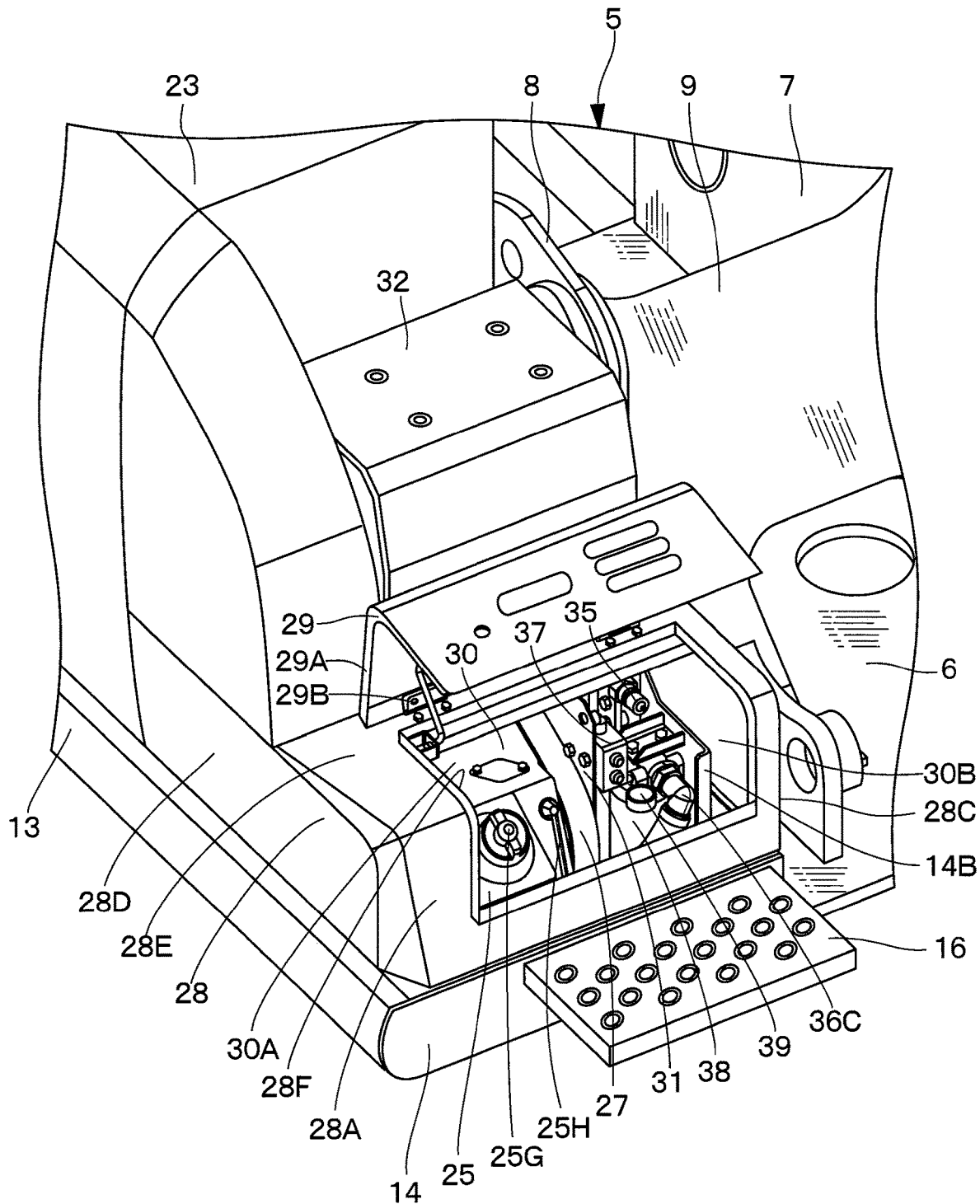
FIG. 6 is a perspective view showing a front side portion of the revolving frame in a state where the urea water tank and the fuel suction port are exposed by opening an opening/closing cover of a first accommodating case.

As shown in FIG. 6, the accommodating space 30 is defined in the first accommodating case 28 at a position on the front right portion of the revolving frame 5. Thereby, the accommodating space 30 is formed having a large capacity within a range from the top surface part 28E to the undercover 15 of the revolving frame 5. In this accommodating space 30, the urea water tank 25, the fuel supply pump 34 to fill the fuel tank 23, the fuel suction port 35 and the like are accommodated by being juxtaposed in the eft-right direction.

The accommodating space 30 is divided by a partition plate 31 installed upright on the undercover 15 at a position in the middle of the left-right direction into a tank space part 30A and a pump space part 30B. The urea water tank 25 is accommodated in the tank space part 30A located on the right side (right side frame 13 side) in the left-right direction. Moreover, the fuel supply pump 34, the fuel suction port 35, an operation switch 37, the fuel filter 38, a clogging indicator 39 and the like which will be described later are accommodated in the pump space part 30B.

A second accommodating case 32 is provided on a rear side above the first accommodating case 28. A length dimension of this second accommodating case 32 in the front-rear direction is set to approximately a half of the length dimension of the first accommodating case 28 in the front-rear direction, for example. A width dimension of the second accommodating case 32 in the left-right direction is set to a dimension shorter than that of the first accommodating case 28, for example. The second accommodating case 32 is mounted on the top surface part 28E of the first accommodating case 28, and its inside is an article accommodating space 33 (see FIG. 5). Various consumables such as a tool box, a spare bottle of urea water and the like (not shown) can be accommodated in this article accommodating space 33.

Next, constitution of the fuel supply pump 34, the fuel suction port 35, the operation switch 37, the fuel filter 38, and the clogging indicator 39, which is a characteristic part of the present invention provided for supplying the fuel to the fuel tank 23 will be described.

Figure 8:
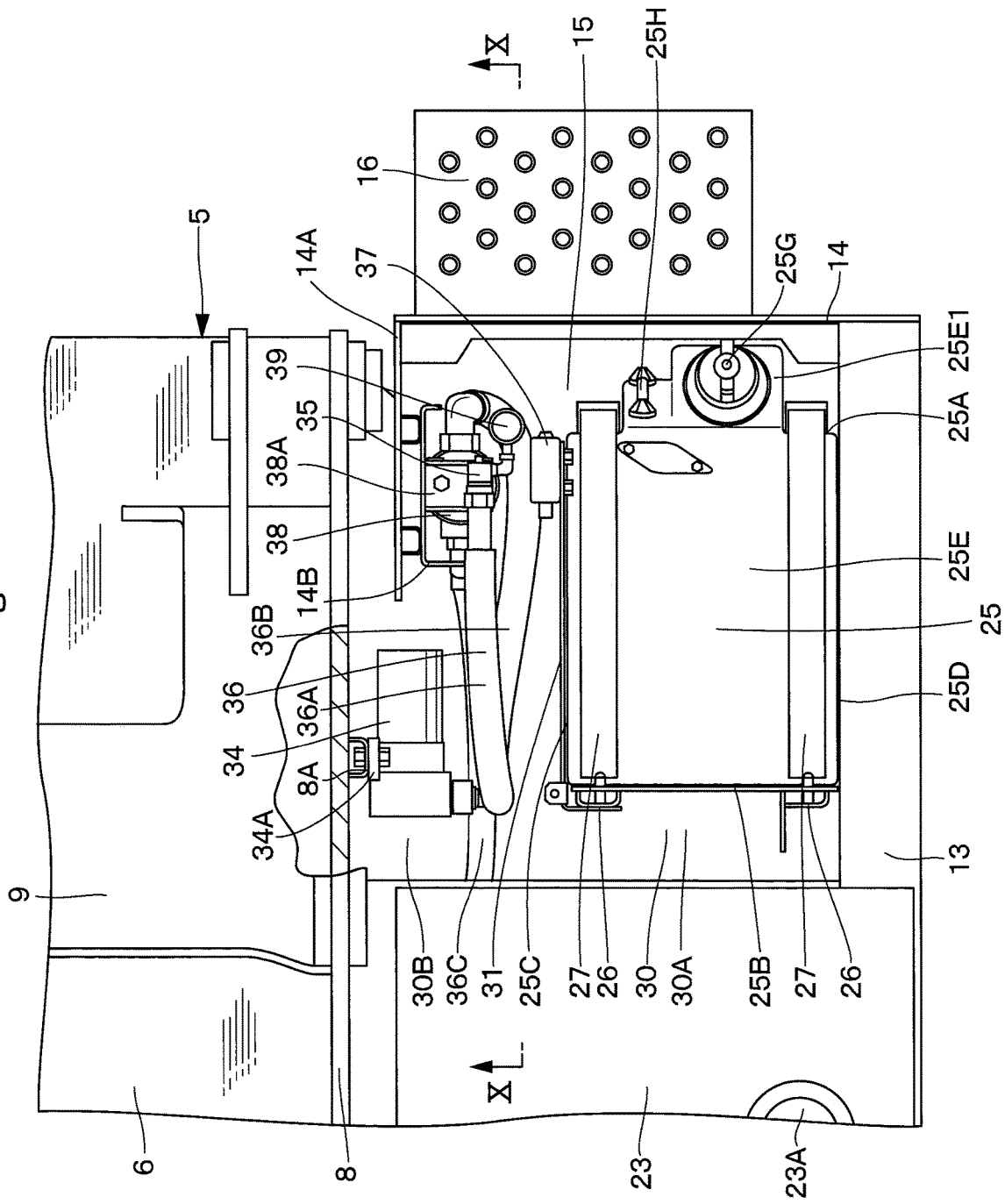
FIG. 8 is a partially broken plan view showing the front side portion of the revolving frame from which each of the accommodating cases is omitted.
Figure 10:
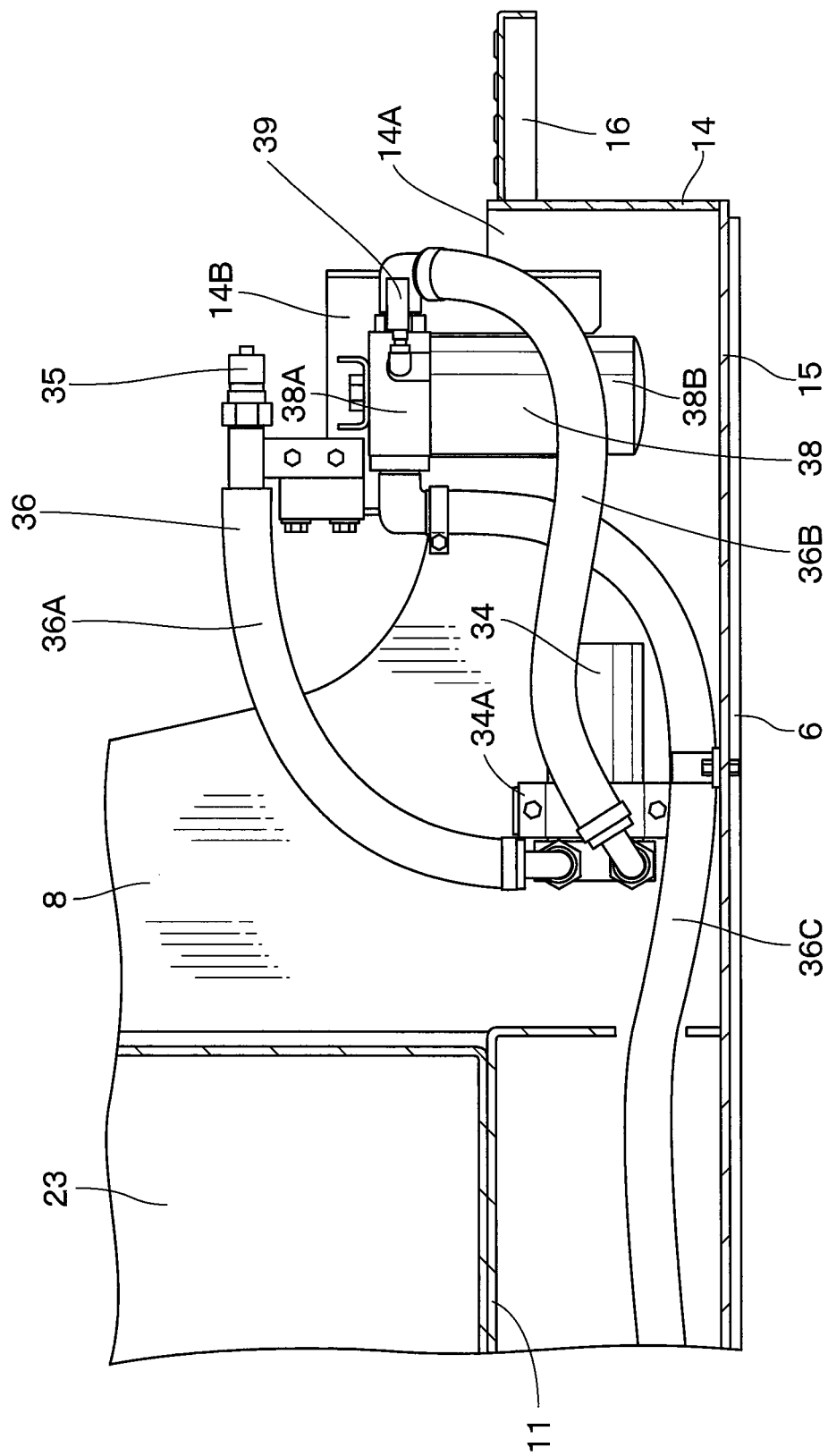
FIG. 10 is a sectional view of the front side portion of the revolving frame, the fuel supply pump, the fuel suction port and the like showing from an arrow X-X direction in FIG. 8.

The fuel supply pump 34 is provided in the first accommodating case 28, that is, at a left depth portion of the pump space part 30B of the accommodating space 30. This fuel supply pump 34 is to supply the fuel stored in a container (not shown) which is an external fuel storage source to the fuel tank 23. The fuel supply pump 34 is constituted by a main body part including a plunger pump, a gear pump, a trochoid pump, a vane pump or the like and the fuel supply pump 34 is driven by an electric motor, for example. Here, as shown in FIG. 8, FIG. 9, and FIG. 10, the fuel supply pump 34 is fixed to a side surface of the right vertical plate 8 by bolting a mounting bracket 34A to a screw seat 8A provided on the right vertical plate 8 of the revolving frame 5. A suction hose 36A which will be described later is connected to the suction side of the fuel supply pump 34, and a delivery hose 36B is connected to the delivery side.

The fuel suction port 35 is provided at a distal end of the suction hose 36A and suctions the fuel into the fuel supply pump 34. This fuel suction port 35 is used by one side joint of one-touch joints called a quick coupling. The fuel suction port 35 formed as the joint has a check valve (not shown) for preventing outflow (backflow) of the fuel other than in the fuel filling work is provided therein. The fuel suction port 35 is arranged in the accommodating space 30 in the first accommodating case 28 and is provided opened to an outside from the opening 28F. Moreover, the fuel suction port 35 is arranged by being juxtaposed with the water supply port 25G of the urea water tank 25 in the left-right direction. That is, the fuel suction port 35 is arranged at a position where the fuel filling work can be performed from the front in a state where the opening/closing cover 29 of the first accommodating case 28 is opened similarly to the water supply port 25G of the urea water tank 25. Further, the fuel suction port 35 is arranged at an interval from the water supply port 25G so that the water supply work of the urea water and the fuel filling work can be performed at the same time.

The fuel suction port 35 is bolted to the mounting bracket 14B provided on the front side beam 14 of the revolving frame 5. Thereby, the fuel suction port 35 is arranged closer to the left side (the right vertical plate 8 side) in the pump space part 30B of the accommodating space 30 and fixed toward the front side so that the fuel filling hose of the external fuel storage source can be easily connected.

The oil supply line 36 is to supply the fuel suctioned through the fuel suction port 35 to the fuel tank 23. As this oil supply line 36, a pressure-resistant hose having flexibility is used. It should be noted that a pipe member made of metal can be used as a part of the oil supply line 36.

The oil supply line 36 is constituted by the suction hose 36A connecting the fuel suction port 35 and the suction side of the fuel supply pump 34 to each other, a delivery hose 36B connecting the delivery side of the fuel supply pump 34 and an inflow side of the fuel filter 38 which will be described later to each other, and the supply hose 36C connecting an outflow side of the fuel filter 38 and the connecting port 23B of the fuel tank 23 to each other.

As shown in FIG. 7, the operation switch 37 is provided in the vicinity of the fuel suction port 35 in the first accommodating case 28. The operation switch 37 is located in the pump space part 30B of the accommodating space 30 and is mounted on the front side of the partition plate 31, adjacent to the fuel suction port 35. This operation switch 37 can drive and stop the fuel supply pump 34 by being operated with a button by a worker. In this case, since the operation switch 37 is close to the fuel suction port 35, a connecting work of the hose for fuel filling and the fuel filling work by the fuel supply pump 34 can be performed smoothly.

The fuel filter 38 is mounted on the mounting bracket 14B of the front side beam 14 at a position below the fuel suction port 35. The fuel filter 38 is constituted by a connecting part 38A on an upper side and a filter part 38B on a lower side. The delivery hose 36B is connected to an inflow side of the connecting part 38A, and the supply hose 36C is connected to an outflow side. Thereby, the fuel filter 38 can catch foreign substances such as dusts and the like contained in the fuel delivered from the fuel supply pump 34 and can supply a clean fuel to the fuel tank 23.

The clogging indicator 39 is provided by being connected to the connecting part 38A of the fuel filter 38. The clogging indicator 39 is to display a clogged state of the fuel filter 38, and a differential pressure gauge or the like as used as the clogging indicator 39, for example. Since this clogging indicator 39 is arranged in the vicinity of the fuel suction port 35 and the operation switch 37, inspection can be easily performed during the fuel filling work.

The hydraulic excavator 1 according to this embodiment has the constitution as above and its operation will be described next.

The operator who got onboard on the cab 21 drives the hydraulic pump 20 by starting the engine 17. By operating a travel lever or the like in this state, the lower traveling structure 2 can be advanced or retreated. On the other hand, by operating a work lever, the working mechanism 4 can be tiltably moved so as to perform an excavating work of earth and sand or the like.

During the operation of the engine 17, nitrogen oxides (NOx) which are harmful substances are exhausted from its exhaust pipe 18. At this time, the urea water in the urea water tank 25 is supplied to the urea water injection valve of the NOx purifying device 24. At this time, the NOx purifying device 24 generates ammonia by injecting the urea water into the exhaust gas from the urea water injection valve. Thereby, the nitrogen oxides are reduced to water and nitrogen and are ejected to an outside via the oxidation catalyst 24C in the urea selective reduction catalyst 24B, whereby an emission of the nitrogen oxides can be reduced.

Here, a case where the urea water is supplied to the urea water tank 25 will be described. First, the worker stands on the front right side of the upper revolving structure 3 and opens the opening/closing cover 29 of the first accommodating case 28 upward. Thereby, the water supply port 25G of the urea water tank 25 accommodated in the accommodating space 30 can be exposed to the outside through the opening 28F, and the urea water can be supplied from the water supply port 25G in this state.

Subsequently, a case where the fuel is supplied from the external fuel storage source to the fuel tank 23 will be described. In this case, similarly to the case of supplying the urea water to the urea water tank 25, the worker stands on the front right side of the upper revolving structure 3 and opens the opening/closing cover 29. Thereby, the fuel suction port 35, the operation switch 37 and the like accommodated in the accommodating space 30 can be exposed to the outside through the opening 28F of the first accommodating case 28. As described above, after the fuel suction port 35, the operation switch 37 and the like are exposed to the outside, a hose (not shown) connected to the external fuel storage source is connected to the fuel suction port 35. Subsequently, the operation switch 37 is operated so as to drive the fuel supply pump 34. Thereby, the fuel suctioned from the external fuel storage source through the hose can be supplied (replenished) to the fuel tank 23 through the oil supply line 36.

During supply of this fuel, by passing the fuel through the fuel filter 38, foreign substances in the fuel can be removed, and a clean fuel is supplied to the fuel tank 23. Moreover, by visually checking the clogging indicator 39 through the opening 28F during the fuel filling work, the clogged state of the fuel filter 38 can be inspected.

Thus, according to this embodiment, the water supply port 25G of the urea water tank 25 and the fuel suction port 35 are provided by being juxtaposed so as to open to the outside in the first accommodating case 28 arranged on the front part of the revolving frame 5. Accordingly, the fuel filling work can be performed from on the ground without getting on the upper revolving structure 3. As a result, the water supply work of the urea water into the urea water tank 25 and the fuel filling work into the fuel tank 23 can be performed at the same time. Thereby, since the works required for supply of the fuel and the urea water can be performed easily and in a shorter time, workability during the supply works can be improved.

Since the first accommodating case 28 can close the opening 28F by closing the opening/closing cover 29, entry of earth and sand or dusts into the first accommodating case 28 can be prevented by this opening/closing cover 29. Moreover, the urea water tank 25, the operation switch 37 and the like in the first accommodating case 28 can be protected by the opening/closing cover 29 from tampering.

Moreover, since the operation switch 37 of the fuel supply pump 34 is provided at a position in the vicinity of the fuel suction port 35, the operation of the operation switch 37 can be easily performed during the fuel filling. Thereby, workability when the fuel is filled can be improved.

Moreover, since the clogging indicator 39 displaying the clogged state of the fuel filter 38 is provided in the first accommodating case 28, the clogging indicator 39 can be visually recognized easily during the fuel and the clogged state of the fuel filter 38 can be easily checked.

Further, the water supply port 25G and the gauge 25H of the urea water tank 25 are provided adjacent to each other. Thereby, when the urea water is to be supplied through the water supply port 25G, supply can be performed while checking the gauge 25H, and the supply work of the urea water can be performed easily.

It should be noted that in this embodiment, it is so constituted that the urea water tank 25 is provided on the right side frame 13 side in the first accommodating case 28, and the fuel suction port 35 is provided on the right vertical plate 8 side in the first accommodating case 28. However, the present invention is not limited thereto, but it may be so constituted that the urea water tank is provided on the right vertical plate side, and the fuel suction port is provided on the right side frame side.

Moreover, in this embodiment, it is so constituted that the fuel filter 38 is provided in the middle of the delivery hose 36B of the oil supply line 36, but it may be provided in the middle of the suction hose between the fuel suction port and the fuel tank.

Further, in this embodiment, as a construction machine, a crawler-type hydraulic excavator 1 is described as an example. However, the present invention is not limited thereto, but it may be also applied to a wheel-type hydraulic excavator. Other than that, it may be also widely applied to other construction machines such as a hydraulic crane and the like.

DESCRIPTION OF REFERENCE NUMERALS

1: Hydraulic excavator (Construction machine)
2: Lower traveling structure
3: Upper revolving structure
4: Working mechanism
5: Revolving frame
17: Engine
18: Exhaust pipe
20: Hydraulic pump
22: Hydraulic oil tank
23: Fuel tank
24: NOx purifying device
25: Urea water tank
25G: Water supply port
28: First accommodating case (Accommodating case)
29: Opening/closing cover
34: Fuel supply pump
35: Fuel suction port
37: Operation switch
38: Fuel filter
39: Clogging indicator

The invention claimed is:

1. A construction machine comprising:
a lower traveling structure, an upper revolving structure rotatably mounted on said lower traveling structure, and a working mechanism tiltably provided on a front part of said upper revolving structure, wherein
said upper revolving structure includes:
a revolving frame,
an engine mounted on a rear side of said revolving frame and driving a hydraulic pump,
a hydraulic oil tank provided on said revolving frame and storing a hydraulic oil to be supplied to said hydraulic pump,
a fuel tank provided on said revolving frame, adjacent to a front side of said hydraulic oil tank, and storing a fuel to be supplied to said engine,
a NOx purifying device provided by being connected to an exhaust pipe of said engine and removing nitrogen oxides contained in an exhaust gas, and
a urea water tank storing urea water to be supplied to said NOx purifying device, wherein
said revolving frame comprises a bottom plate, a left vertical plate and a right vertical plate extending in a front-rear direction with a predetermined interval in a left-right direction of said bottom plate, a front plate connecting front side portions of said left and right vertical plates, a plurality of left extension beams extending from said bottom plate and said left vertical plate to a left side of said bottom plate, a plurality of right extension beams extending from said bottom plate and said right vertical plate to a right side of said bottom plate, a left side frame joined to a distal end portion of each of said plurality of left extension beams and extending on the left side of said bottom plate in the front-rear direction, a right side frame joined to a distal end portion of each of said plurality of right extension beams and extending on the right side of said bottom plate in the front-rear direction, and a front side beam extended in the left-right direction between a front part of said right vertical plate and a front part of said right side frame, wherein a fuel supply pump for supplying a fuel stored in an external fuel storage source to said fuel tank is connected to said fuel tank;

a fuel suction port for sucking the fuel is connected to said fuel supply pump;

a water supply port of the urea water is provided in said urea water tank;

an accommodating case formed as a hollow structure made of a front surface part installed upright from a front end of said front side beam, a rear surface part installed upright at a position close to a front end of said fuel tank, a left side surface part and a right side surface part installed upright so as to stand between said front surface part and said rear surface part, and a top surface part closing an upper side of said front surface part, said rear surface part, said left side surface part, and said right side surface part and provided with an opening having a large width in a left-right direction of said revolving frame over said front surface part and said top surface part, is provided on a right front part of said revolving frame;

said accommodating case is provided with an opening/closing cover having a fulcrum at a rear part of said top surface part to cover said opening;

an accommodating space inside of said accommodating case is divided by a partition plate provided inside of said accommodating case into a tank space part located on said right side frame side which is the right side in the left-right direction of said revolving frame and accommodates said urea water tank, and a pump space part located on said right vertical plate side which is the left side in the left-right direction of said revolving frame and accommodates said fuel supply pump, wherein said water supply port is arranged in said tank space part, at a position where a supply work to said water supply port of said urea water tank is performed from a front in a state where said opening/closing cover is left opened, and said fuel suction port is arranged in said pump space part to be juxtaposed with said water supply port of said urea water tank in the left-right direction at an interval so as to perform a supply work to said fuel suction port from the front in the state where said opening/closing cover is left opened.

2. The construction machine according to claim 1, wherein a fuel filter for removing foreign substances in the fuel is provided in the middle of a passage from said fuel suction port to said fuel tank; and a clogging indicator for displaying a clogged state of said fuel filter is provided in said accommodating case.

* * * * *